(12) United States Patent
Richardson et al.

(10) Patent No.: US 9,391,949 B1
(45) Date of Patent: *Jul. 12, 2016

(54) REQUEST ROUTING PROCESSING

(75) Inventors: David R. Richardson, Seattle, WA (US);
Colm MacCarthaigh, Seattle, WA (US);
Benjamin W. S. Redman, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 584 days.

This patent is subject to a terminal disclaimer.

(21) Appl. No.: 12/960,402

(22) Filed: Dec. 3, 2010

(51) Int. Cl.
*G06F 15/16* (2006.01)
*H04L 29/12* (2006.01)

(52) U.S. Cl.
CPC ....... *H04L 61/1511* (2013.01); *H04L 29/12047* (2013.01)

(58) Field of Classification Search
CPC .............. H04L 61/1511; H04L 29/12066; H04L 67/1002; H04L 61/2007; H04L 41/0803; H04L 61/00; H04L 61/15; H04L 29/12216; H04L 29/12367; H04L 61/6013; H04L 45/22; H04L 61/20; H04L 61/3025; H04L 29/12047; H04L 29/12207; H04L 29/12; H04L 67/2814; H04L 61/2503; H04L 61/1021; H04L 67/1036; H04L 67/2842; H04L 61/1541; G06F 17/30091; G06F 17/30657; G06F 17/30
USPC .......................................................... 703/245
See application file for complete search history.

(56) References Cited

U.S. PATENT DOCUMENTS 5,063,500 A 11/1991 Shorter
5,341,477 A 8/1994 Pitkin et al.
5,459,837 A 10/1995 Caccavale
5,611,049 A 3/1997 Pitts
5,701,467 A 12/1997 Freeston
(Continued)

FOREIGN PATENT DOCUMENTS

CA 2741 895 A1 5/2010
CN 1422468 A 6/2003
(Continued)

OTHER PUBLICATIONS

International Search Report and Written Opinion in PCT/US2011/053302 mailed Nov. 28, 2011 in 11 pages.
(Continued)

*Primary Examiner* — Dustin Nguyen
*Assistant Examiner* — Hao Nguyen
(74) *Attorney, Agent, or Firm* — Knobbe Martens Olson & Bear LLP

(57) ABSTRACT

Generally described, the present disclosure is directed to managing request routing functionality corresponding to resource requests for one or more resources associated with a content provider. A service provider can assign a set of DNS servers corresponding to a distributed set of network addresses, or portions of network addresses, for one or more identifiable domains. If the service provider receives requests to assign a DNS server to conflicting domains, the set of DNS servers for each identifiable domain are assigned such that there are no matching network addresses between the sets of domains associated with the conflicting domains. Thereafter, DNS resolver components can be configured such that DNS queries may be resolved in accordance with a determination of an authoritative DNS server based on the identified destination address associated with the DNS queries.

21 Claims, 8 Drawing Sheets

(56) References Cited

U.S. PATENT DOCUMENTS

| | | |
|---|---|---|
| 5,764,910 A | 6/1998 | Shachar |
| 5,774,660 A | 6/1998 | Brendel et al. |
| 5,852,717 A | 12/1998 | Bhide et al. |
| 5,892,914 A | 4/1999 | Pitts |
| 5,893,116 A | 4/1999 | Simmonds et al. |
| 5,895,462 A | 4/1999 | Toki |
| 5,933,811 A | 8/1999 | Angles et al. |
| 5,937,427 A | 8/1999 | Shinagawa et al. |
| 5,974,454 A | 10/1999 | Apfel et al. |
| 5,991,306 A | 11/1999 | Burns et al. |
| 6,016,512 A | 1/2000 | Huitema |
| 6,026,452 A | 2/2000 | Pitts |
| 6,038,601 A | 3/2000 | Lambert et al. |
| 6,052,718 A | 4/2000 | Gifford |
| 6,078,960 A | 6/2000 | Ballard |
| 6,085,234 A | 7/2000 | Pitts et al. |
| 6,092,100 A | 7/2000 | Berstis et al. |
| 6,098,096 A | 8/2000 | Tsirigotis et al. |
| 6,108,703 A | 8/2000 | Leighton et al. |
| 6,128,279 A | 10/2000 | O'Neil et al. |
| 6,157,942 A | 12/2000 | Chu et al. |
| 6,167,438 A | 12/2000 | Yates et al. |
| 6,167,446 A | 12/2000 | Lister et al. |
| 6,182,111 B1 | 1/2001 | Inohara et al. |
| 6,182,125 B1 | 1/2001 | Borella et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Byrne |
| 6,243,761 B1 | 6/2001 | Mogul et al. |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,324,580 B1 | 11/2001 | Jindal et al. |
| 6,330,602 B1 | 12/2001 | Law et al. |
| 6,338,082 B1 | 1/2002 | Schneider |
| 6,345,308 B1 | 2/2002 | Abe |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,377,257 B1 | 4/2002 | Borrel et al. |
| 6,386,043 B1 | 5/2002 | Mullins |
| 6,405,252 B1 | 6/2002 | Gupta et al. |
| 6,408,360 B1 | 6/2002 | Chamberlain et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,442,165 B1 | 8/2002 | Sitaraman et al. |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,493,765 B1 * | 12/2002 | Cunningham .... H04L 29/12018 370/351 |
| 6,505,241 B2 | 1/2003 | Pitts |
| 6,523,036 B1 | 2/2003 | Hickman et al. |
| 6,529,910 B1 | 3/2003 | Fleskes |
| 6,529,953 B1 | 3/2003 | Van Renesse |
| 6,553,413 B1 | 4/2003 | Leighton et al. |
| 6,560,610 B1 | 5/2003 | Eatherton et al. |
| 6,611,873 B1 | 8/2003 | Kanehara |
| 6,643,357 B2 | 11/2003 | Lumsden |
| 6,643,707 B1 | 11/2003 | Booth |
| 6,654,807 B2 | 11/2003 | Farber et al. |
| 6,658,462 B1 | 12/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,694,358 B1 | 2/2004 | Swildens et al. |
| 6,697,805 B1 | 2/2004 | Choquier et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,760,721 B1 | 7/2004 | Chasen et al. |
| 6,769,031 B1 | 7/2004 | Bero |
| 6,782,398 B1 | 8/2004 | Bahl |
| 6,785,704 B1 | 8/2004 | McCanne |
| 6,795,434 B1 | 9/2004 | Kumar et al. |
| 6,799,214 B1 | 9/2004 | Li |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,862,607 B1 | 3/2005 | Vermeulen |
| 6,874,017 B1 | 3/2005 | Inoue et al. |
| 6,917,951 B2 | 7/2005 | Orbits et al. |
| 6,928,467 B2 | 8/2005 | Peng et al. |
| 6,928,485 B1 | 8/2005 | Krishnamurthy et al. |
| 6,941,562 B2 | 9/2005 | Gao et al. |
| 6,963,850 B1 | 11/2005 | Bezos et al. |
| 6,976,090 B2 | 12/2005 | Ben-Shaul et al. |
| 6,981,017 B1 | 12/2005 | Kasriel et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,031,445 B2 | 4/2006 | Lumsden |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,266 B2 | 8/2006 | Lewin et al. |
| 7,099,936 B2 | 8/2006 | Chase et al. |
| 7,103,645 B2 | 9/2006 | Leighton et al. |
| 7,114,160 B2 | 9/2006 | Suryanarayana et al. |
| 7,117,262 B2 | 10/2006 | Bai et al. |
| 7,133,905 B2 | 11/2006 | Dilley et al. |
| 7,136,922 B2 | 11/2006 | Sundaram et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,174,382 B2 | 2/2007 | Ramanathan et al. |
| 7,185,063 B1 | 2/2007 | Kasriel et al. |
| 7,185,084 B2 | 2/2007 | Sirivara et al. |
| 7,188,214 B1 | 3/2007 | Kasriel et al. |
| 7,194,522 B1 | 3/2007 | Swildens et al. |
| 7,194,552 B1 | 3/2007 | Schneider |
| 7,200,667 B2 | 4/2007 | Teodosiu et al. |
| 7,216,170 B2 | 5/2007 | Daniel et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 | 7/2007 | Wein et al. |
| 7,251,675 B1 | 7/2007 | Kamakura et al. |
| 7,254,626 B1 | 8/2007 | Kommula et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |

(56) References Cited

U.S. PATENT DOCUMENTS

| | | |
|---|---|---|
| 7,274,658 B2 | 9/2007 | Bornstein et al. |
| 7,284,056 B2 | 10/2007 | Ramig |
| 7,289,519 B1 | 10/2007 | Liskov |
| 7,293,093 B2 | 11/2007 | Leighton |
| 7,308,499 B2 | 12/2007 | Chavez |
| 7,310,686 B2 | 12/2007 | Uysal |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,339,937 B2 | 3/2008 | Mitra et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,373,416 B2 | 5/2008 | Kagan et al. |
| 7,376,736 B2 | 5/2008 | Sundaram et al. |
| 7,380,078 B2 | 5/2008 | Ikegaya et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,430,610 B2 | 9/2008 | Pace et al. |
| 7,441,045 B2 | 10/2008 | Skene et al. |
| 7,441,261 B2 | 10/2008 | Slater et al. |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,594,189 B1 | 9/2009 | Walker et al. |
| 7,596,619 B2 | 9/2009 | Leighton et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,685,251 B2 | 3/2010 | Houlihan et al. |
| 7,693,813 B1 | 4/2010 | Cao et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,756,965 B2 | 7/2010 | Joshi |
| 7,757,202 B2 | 7/2010 | Dahlstedt et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,873,065 B1 | 1/2011 | Mukerji et al. |
| 7,890,612 B2 | 2/2011 | Todd et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,010,707 B2 | 8/2011 | Elzur et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |
| 8,156,199 B1 | 4/2012 | Hoche-Mong et al. |
| 8,156,243 B2 | 4/2012 | Richardson et al. |
| 8,190,682 B2 | 5/2012 | Paterson-Jones et al. |
| 8,195,837 B2 | 6/2012 | McCarthy et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,266,288 B2 | 9/2012 | Banerjee et al. |
| 8,266,327 B2 | 9/2012 | Kumar et al. |
| 8,280,998 B2 | 10/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,301,645 B1 | 10/2012 | Crook |
| 8,321,568 B2 | 11/2012 | Sivasubramanian et al. |
| 8,380,831 B2 | 2/2013 | Barber |

(56) References Cited

U.S. PATENT DOCUMENTS

| | | |
|---|---|---|
| 8,402,137 B2 | 3/2013 | Sivasubramanian et al. |
| 8,433,749 B2 | 4/2013 | Wee et al. |
| 8,447,876 B2 | 5/2013 | Verma et al. |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,908 B2 | 8/2013 | Holmes et al. |
| 8,526,405 B2 | 9/2013 | Curtis et al. |
| 8,527,658 B2 | 9/2013 | Holmes et al. |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 8,606,996 B2 | 12/2013 | Richardson et al. |
| 8,612,565 B2 | 12/2013 | Schneider |
| 8,615,549 B2 | 12/2013 | Knowles et al. |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,676,918 B2 | 3/2014 | Richardson et al. |
| 8,683,076 B2 | 3/2014 | Farber et al. |
| 8,688,837 B1 | 4/2014 | Richardson et al. |
| 8,712,950 B2 | 4/2014 | Smith et al. |
| 8,732,309 B1 | 5/2014 | Richardson et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 8,782,279 B2 | 7/2014 | Eggleston et al. |
| 8,819,283 B2 | 8/2014 | Richardson et al. |
| 8,914,514 B1 | 12/2014 | Jenkins et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,938,526 B1 | 1/2015 | Richardson et al. |
| 8,966,318 B1 | 2/2015 | Shah |
| 9,003,035 B1 | 4/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,106,701 B2 | 8/2015 | Richardson et al. |
| 9,130,756 B2 | 9/2015 | Richardson et al. |
| 9,154,551 B1 | 10/2015 | Watson |
| 9,160,703 B2 | 10/2015 | Richardson et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |
| 9,191,458 B2 | 11/2015 | Richardson et al. |
| 2001/0000811 A1 | 5/2001 | May et al. |
| 2001/0025305 A1 | 9/2001 | Yoshiasa et al. |
| 2001/0032133 A1 | 10/2001 | Moran |
| 2001/0034704 A1 | 10/2001 | Farhat et al. |
| 2001/0049741 A1* | 12/2001 | Skene et al. ............... 709/232 |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010798 A1 | 1/2002 | Ben-Shaul et al. |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0087374 A1 | 7/2002 | Boubez et al. |
| 2002/0091786 A1 | 7/2002 | Yamaguchi et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0107944 A1 | 8/2002 | Bai et al. |
| 2002/0112049 A1 | 8/2002 | Elnozahy et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0143989 A1 | 10/2002 | Huitema et al. |
| 2002/0145993 A1* | 10/2002 | Chowdhury ...... H04L 29/12009 370/338 |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0188722 A1 | 12/2002 | Banerjee et al. |
| 2002/0194324 A1 | 12/2002 | Guha |
| 2002/0198953 A1 | 12/2002 | O'Rourke et al. |
| 2003/0002484 A1 | 1/2003 | Freedman |
| 2003/0007482 A1 | 1/2003 | Khello et al. |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037139 A1 | 2/2003 | Shteyn |
| 2003/0041094 A1 | 2/2003 | Lara et al. |
| 2003/0065739 A1 | 4/2003 | Shnier |
| 2003/0074401 A1 | 4/2003 | Connell et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0112792 A1 | 6/2003 | Cranor et al. |
| 2003/0120741 A1 | 6/2003 | Wu et al. |
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |

(56) References Cited

U.S. PATENT DOCUMENTS

| | | |
|---|---|---|
| 2003/0174648 A1 | 9/2003 | Wang et al. |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2004/0010563 A1 | 1/2004 | Forte et al. |
| 2004/0010588 A1 | 1/2004 | Slater et al. |
| 2004/0010621 A1 | 1/2004 | Afergan et al. |
| 2004/0015584 A1 | 1/2004 | Cartmell et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0167981 A1 | 8/2004 | Douglas et al. |
| 2004/0167982 A1 | 8/2004 | Cohen et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0188073 A1 | 8/2005 | Nakamichi et al. |
| 2005/0192008 A1 | 9/2005 | Desai et al. |
| 2005/0198334 A1 | 9/2005 | Farber et al. |
| 2005/0198571 A1 | 9/2005 | Kramer et al. |
| 2005/0216569 A1 | 9/2005 | Coppola et al. |
| 2005/0216674 A1 | 9/2005 | Robbin et al. |
| 2005/0229119 A1 | 10/2005 | Torvinen |
| 2005/0232165 A1 | 10/2005 | Brawn et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0047787 A1 | 3/2006 | Agarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0143293 A1 | 6/2006 | Freedman |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1* | 7/2006 | Banerjee ............ H04L 29/12066 370/351 |
| 2006/0168088 A1 | 7/2006 | Leighton et al. |
| 2006/0173957 A1 | 8/2006 | Robinson |
| 2006/0179080 A1 | 8/2006 | Meek et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0227740 A1 | 10/2006 | McLaughlin et al. |
| 2006/0227758 A1* | 10/2006 | Rana et al. .................... 370/351 |
| 2006/0230137 A1 | 10/2006 | Gare et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2007/0005689 A1 | 1/2007 | Leighton et al. |
| 2007/0005801 A1 | 1/2007 | Kumar et al. |

(56) References Cited

U.S. PATENT DOCUMENTS

| | | |
|---|---|---|
| 2007/0005892 A1 | 1/2007 | Mullender et al. |
| 2007/0011267 A1 | 1/2007 | Overton et al. |
| 2007/0014241 A1* | 1/2007 | Banerjee .......... H04L 29/12066 370/238 |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0061440 A1 | 3/2007 | Sundaram et al. |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156919 A1 | 7/2007 | Potti et al. |
| 2007/0162331 A1 | 7/2007 | Sullivan |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0244964 A1 | 10/2007 | Challenger et al. |
| 2007/0250467 A1 | 10/2007 | Mesnik et al. |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1* | 11/2007 | Zubev .......................... 709/230 |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2008/0005057 A1 | 1/2008 | Ozzie et al. |
| 2008/0008089 A1 | 1/2008 | Bornstein et al. |
| 2008/0016233 A1 | 1/2008 | Schneider |
| 2008/0025304 A1 | 1/2008 | Venkataswami et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086574 A1 | 4/2008 | Raciborski et al. |
| 2008/0092242 A1 | 4/2008 | Rowley |
| 2008/0103805 A1 | 5/2008 | Shear et al. |
| 2008/0104268 A1 | 5/2008 | Farber et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1* | 9/2008 | Farber et al. .................. 709/245 |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235400 A1 | 9/2008 | Slocombe et al. |
| 2008/0256175 A1 | 10/2008 | Lee et al. |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0086741 A1 | 4/2009 | Zhang et al. |
| 2009/0089869 A1 | 4/2009 | Varghese |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 8/2009 | Sundaram et al. |
| 2009/0204682 A1 | 8/2009 | Jeyaseelan et al. |
| 2009/0210549 A1 | 8/2009 | Hudson et al. |
| 2009/0233623 A1 | 9/2009 | Johnson |
| 2009/0241167 A1 | 9/2009 | Moore |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1* | 10/2009 | Richardson et al. .......... 709/239 |
| 2009/0249222 A1 | 10/2009 | Schmidt et al. |
| 2009/0253435 A1 | 10/2009 | Olofsson |

(56) References Cited

U.S. PATENT DOCUMENTS

| | | |
|---|---|---|
| 2009/0254661 A1 | 10/2009 | Fullagar et al. |
| 2009/0259971 A1 | 10/2009 | Rankine et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1* | 12/2009 | Sivasubramanian et al. . 709/238 |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0023601 A1 | 1/2010 | Lewin et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1* | 2/2010 | Jeon et al. ............... 709/226 |
| 2010/0057894 A1 | 3/2010 | Glasser |
| 2010/0070603 A1 | 3/2010 | Moss et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0100629 A1 | 4/2010 | Raciborski et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1* | 5/2010 | Drako ............... 709/245 |
| 2010/0122069 A1 | 5/2010 | Gonion |
| 2010/0125626 A1* | 5/2010 | Lucas ............... H04L 67/1008 709/203 |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0174811 A1 | 7/2010 | Musiri et al. |
| 2010/0192225 A1 | 7/2010 | Ma et al. |
| 2010/0217801 A1 | 8/2010 | Leighton et al. |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0268814 A1* | 10/2010 | Cross ............... H04L 29/12066 709/224 |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0332595 A1 | 12/2010 | Fullagar et al. |
| 2011/0010244 A1 | 1/2011 | Hatridge |
| 2011/0029598 A1 | 2/2011 | Arnold et al. |
| 2011/0040893 A1 | 2/2011 | Karaoguz et al. |
| 2011/0055714 A1 | 3/2011 | Vemulapalli et al. |
| 2011/0055921 A1 | 3/2011 | Narayanaswamy et al. |
| 2011/0058675 A1 | 3/2011 | Brueck et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0087769 A1 | 4/2011 | Holmes et al. |
| 2011/0096987 A1 | 4/2011 | Morales et al. |
| 2011/0113467 A1 | 5/2011 | Agarwal et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0161461 A1 | 6/2011 | Niven-Jenkins |
| 2011/0166935 A1 | 7/2011 | Armentrout et al. |
| 2011/0191449 A1 | 8/2011 | Swildens et al. |
| 2011/0191459 A1 | 8/2011 | Joshi |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |
| 2011/0219372 A1 | 9/2011 | Agarwal et al. |
| 2011/0238501 A1 | 9/2011 | Almeida |
| 2011/0238793 A1* | 9/2011 | Bedare et al. ............... 709/220 |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2011/0320559 A1 | 12/2011 | Foti |
| 2012/0011190 A1 | 1/2012 | Driesen et al. |
| 2012/0036238 A1 | 2/2012 | Sundaram et al. |
| 2012/0066360 A1 | 3/2012 | Ghosh |
| 2012/0079115 A1 | 3/2012 | Richardson et al. |
| 2012/0089972 A1 | 4/2012 | Scheidel et al. |
| 2012/0096065 A1 | 4/2012 | Suit et al. |
| 2012/0124184 A1 | 5/2012 | Sakata et al. |
| 2012/0131177 A1* | 5/2012 | Brandt et al. ............... 709/224 |
| 2012/0136697 A1 | 5/2012 | Peles et al. |
| 2012/0143688 A1 | 6/2012 | Alexander |
| 2012/0159476 A1 | 6/2012 | Ramteke et al. |
| 2012/0166516 A1 | 6/2012 | Simmons et al. |
| 2012/0169646 A1 | 7/2012 | Berkes et al. |
| 2012/0173677 A1 | 7/2012 | Richardson et al. |
| 2012/0173760 A1 | 7/2012 | Jog et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0224516 A1* | 9/2012 | Stojanovski ...... H04L 29/12066 370/310 |
| 2012/0233522 A1 | 9/2012 | Barton et al. |
| 2012/0233668 A1 | 9/2012 | Leafe et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0019311 A1 | 1/2013 | Swildens et al. |
| 2013/0041872 A1 | 2/2013 | Aizman et al. |
| 2013/0046869 A1 | 2/2013 | Jenkins et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0086001 A1 | 4/2013 | Bhogal et al. |
| 2013/0117849 A1 | 5/2013 | Golshan et al. |
| 2013/0130221 A1 | 5/2013 | Kortemeyer et al. |
| 2013/0151646 A1 | 6/2013 | Chidambaram et al. |
| 2013/0198341 A1 | 8/2013 | Kim |
| 2013/0212300 A1 | 8/2013 | Eggleston et al. |
| 2013/0227165 A1 | 8/2013 | Liu |
| 2013/0246567 A1 | 9/2013 | Green et al. |
| 2013/0268616 A1 | 10/2013 | Sakata et al. |
| 2013/0305046 A1 | 11/2013 | Mankovski et al. |
| 2013/0311605 A1 | 11/2013 | Richardson et al. |
| 2013/0318153 A1 | 11/2013 | Sivasubramanian et al. |
| 2013/0339429 A1 | 12/2013 | Richardson et al. |
| 2013/0346567 A1 | 12/2013 | Richardson et al. |

(56) References Cited

U.S. PATENT DOCUMENTS

| | | |
|---|---|---|
| 2014/0007239 A1 | 1/2014 | Sharpe et al. |
| 2014/0019605 A1 | 1/2014 | Boberg |
| 2014/0036675 A1 | 2/2014 | Wang et al. |
| 2014/0040478 A1 | 2/2014 | Hsu et al. |
| 2014/0053022 A1 | 2/2014 | Forgette et al. |
| 2014/0059198 A1 | 2/2014 | Richardson et al. |
| 2014/0059379 A1 | 2/2014 | Ren et al. |
| 2014/0075109 A1 | 3/2014 | Richardson et al. |
| 2014/0089917 A1 | 3/2014 | Attalla et al. |
| 2014/0137111 A1 | 5/2014 | Dees et al. |
| 2014/0143320 A1 | 5/2014 | Sivasubramanian et al. |
| 2014/0165061 A1 | 6/2014 | Greene et al. |
| 2014/0257891 A1 | 9/2014 | Richardson et al. |
| 2014/0297870 A1 | 10/2014 | Eggleston et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0365666 A1 | 12/2014 | Richardson et al. |
| 2015/0081842 A1 | 3/2015 | Richardson et al. |
| 2015/0172379 A1 | 6/2015 | Richardson et al. |
| 2015/0172407 A1 | 6/2015 | MacCarthaigh et al. |
| 2015/0172414 A1 | 6/2015 | Richardson et al. |
| 2015/0172415 A1 | 6/2015 | Richardson et al. |
| 2015/0180988 A1 | 6/2015 | Sivasubramanian et al. |
| 2015/0188994 A1 | 7/2015 | Marshall et al. |
| 2015/0195244 A1 | 7/2015 | Richardson et al. |
| 2015/0207733 A1 | 7/2015 | Richardson et al. |
| 2015/0215270 A1 | 7/2015 | Sivasubramanian et al. |
| 2015/0229710 A1 | 8/2015 | Sivasubramanian et al. |
| 2015/0249579 A1 | 9/2015 | Ellsworth et al. |
| 2015/0256647 A1 | 9/2015 | Richardson et al. |
| 2015/0319194 A1 | 11/2015 | Richardson et al. |
| 2015/0319260 A1 | 11/2015 | Watson |
| 2015/0334082 A1 | 11/2015 | Richardson et al. |

FOREIGN PATENT DOCUMENTS

| | | |
|---|---|---|
| CN | 1605182 A | 4/2005 |
| CN | 101189598 A | 5/2008 |
| CN | 101460907 A | 6/2009 |
| CN | 103731481 A | 4/2014 |
| EP | 1603307 A2 | 12/2005 |
| EP | 1351141 A2 | 10/2007 |
| EP | 2008167 | 12/2008 |
| JP | 2001-0506093 | 5/2001 |
| JP | 2001-249907 | 9/2001 |
| JP | 2002-044137 | 2/2002 |
| JP | 2003-167810 A | 6/2003 |
| JP | 2003-167813 A | 6/2003 |
| JP | 2003188901 A | 7/2003 |
| JP | 2003522358 A | 7/2003 |
| JP | 2004-533738 A | 11/2004 |
| JP | 2005-537687 | 12/2005 |
| JP | 2007-133896 A | 5/2007 |
| JP | 2009-071538 A | 4/2009 |
| JP | 2012-509623 | 4/2012 |
| JP | 2012-209623 | 10/2012 |
| WO | WO 02/069608 A2 | 9/2002 |
| WO | WO 2005/071560 A1 | 8/2005 |
| WO | WO 2007/007960 A1 | 1/2007 |
| WO | WO 2007/126837 A3 | 11/2007 |
| WO | WO 2009124006 A2 | 10/2009 |
| WO | WO 2010/002603 A1 | 1/2010 |
| WO | WO 2012/044587 | 4/2012 |
| WO | WO 2012/044587 A1 | 4/2012 |
| WO | WO 2012065641 A1 | 5/2012 |

OTHER PUBLICATIONS

Singapore Written Opinion in Application No. 201006836-9, mailed Oct. 12, 2011 in 12 pages.
Singapore Written Opinion in Application No. 201006837-7, mailed Oct. 12, 2011 in 11 pages.
Singapore Written Opinion in Application No. 201006874-0, mailed Oct. 12, 2011 in 10 pages.
First Office Action in Chinese Application No. 200980145872.4 dated Nov. 29, 2012.
Search Report and Written Opinion in Singapore Application No. 201103333-9 mailed Nov. 19, 2012.
Supplementary European Search Report in Application No. 09727694.3 mailed Jan. 30, 2012 in 6 pages.
"Global Server Load Balancing with Serverlron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (Strongman)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3 .xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
Bellovin, S., "Distributed Firewalls," ;login:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement it?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.

(56) References Cited

OTHER PUBLICATIONS

Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
First Office Action in Chinese Application No. 200980111426.1 mailed Feb. 16, 2013.
Gruener, J., "A Vision of Togetherness," May 24, 2004, NetworkWorld, retrieved May 3, 2006, from, http://www.networkworld.com/supp/2004/ndc3/0524virt.html, 9 pages.
International Preliminary Report on Patentability in PCT/US2007/007601 mailed Sep. 30, 2008 in 8 pages.
International Search Report and Written Opinion in PCT/US07/07601 mailed Jul. 18, 2008 in 11 pages.
International Search Report and Written Opinion in PCT/US2010/060567 mailed on Mar. 28, 2012.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kenshi, P., "Help File Library: 1ptables Basics," Justlinux, retrieved Dec. 1, 2005, from http://www.justlinux.com/nhf/Security/Iptables_Basics.html, 4 pages.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Office Action in Candian Application No. 2741895 dated Feb. 25, 2013.
Office Action in Japanese Application No. 2011-502138 mailed Feb. 1, 2013.
Office Action in Japanese Application No. 2011-502140 mailed Dec. 7, 2012.
Office Action in Japanese Application No. 2012-052264 mailed Dec. 11, 2012 in 26 pages.
Shankland, S., "Sun to buy start-up to bolster N1 ," Jul. 30, 2003, CNet News.com, retrieved May 3, 2006, http://news.zdnet.conn/2100-3513_22-5057752.html, 8 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Supplementary European Search Report in Application No. 07754164.7 mailed Dec. 20, 2010 in 7 pages.
Supplementary European Search Report in Application No. 09728756.9 mailed Jan. 8, 2013.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
International Search Report and Written Opinion in PCT/US2011/061486 mailed Mar. 30, 2012 in 11 pages.
American Bar Association; Digital Signature Guidelines Tutorial [online]; Feb. 10, 2002 [retrived on Mar. 2, 2010]; American Bar Association Section of Science and Technology Information Security Committee; Retrieved from the internet: <URL: http://web.archive.org/web/20020210124615/www.abanet.org/scitech/ec/isc/dsg-tutorial.html; pp. 1-8.
Singapore Examination Report in Application No. 201006837-7 mailed May 16, 2012.
Baglioni et al., "Preprocessing and Mining Web Log Data for Web Personalization", LNAI 2829, 2003, pp. 237-249.
Liu et al., "Combined mining of Web server logs and web contents for classifying user navigation patterns and predicting users' future requests," Data & Knowledge Engineering 61 (2007) pp. 304-330.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Xu et al., "Decision tree regression for soft classification of remote sensing data", Remote Sensing of Environment 97 (2005) pp. 322-336.
First Office Action in Chinese Application No. 200980119993.1 dated Jul. 4, 2012.
First Office Action in Chinese Application No. 200980119995.0 dated Jul. 6, 2012.
Singapore Written Opinion in Application No. 201006836-9, mailed Apr. 30, 2012 in 10 pages.
Examination Report in Singapore Application No. 201103333-9 dated Aug. 13, 2013.
Office Action in Chinese Application No. 200980119993.1 dated Oct. 21, 2013.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bennami, M., et al., Resource Allocation for Autonomic Data Centers Using Analytic Performance Models, 2005, IEEE, 12 pages.
Chipara et al, "Realtime Power-Aware Routing in Sensor Network", IEEE, 2006, 10 pages.
International Preliminary Report on Patentability and Written Opinion in PCT/US2010/060567 mailed on Jun. 19, 2012.
International Preliminary Report on Patentability and Written Opinion in PCT/US2010/060569 mailed Jun. 19, 2012.
International Preliminary Report on Patentability and Written Opinion in PCT/US2010/060573 mailed Jun. 19, 2012.
International Preliminary Report on Patentability in PCT/US2011/053302 mailed Apr. 2, 2013.
International Preliminary Report on Patentability in PCT/US2011/061486 mailed May 22, 2013.
Kounev, S., et al., Autonomic QoS-Aware Resource Management in Grid Computing Using Online Performance Models, 2007, ICST, Valuetools, 2007, 10 pages.
Office Action in Canadian Application No. 2726915 dated May 13, 2013.
Office Action in Chinese Application No. 200780020255.2 dated Mar. 4, 2013.
Office Action in Chinese Application No. 200980119995.0 dated Apr. 15, 2001.
Office Action in Japanese Application No. 2011-516466 mailed Mar. 6, 2013.
Second Office Action in Chinese Application No. 200980119993.1 dated Mar. 12, 2013.
Office Action in Canadian Application No. 2741895 dated Feb. 25, 2013.

(56) References Cited

OTHER PUBLICATIONS

Office Action in Korean Application No. 10-2011-7002461 mailed May 29, 2013.
Preliminary Examination in Chinese Application No. 201180053405.6 dated May 28, 2013.
Gunther et al, "Measuring Round Trip Times to determine the Distance between WLAN Nodes", Dec. 18, 2004, Technical University Berlin, all pages.
First Office Action in Chinese Application No. 200980111422.3 dated Apr. 13, 2012.
Second Office Action in Chinese Application No. 200980111426.1 mailed Dec. 25, 2013.
Third Office Action in Chinese Application No. 200980111426.1 mailed Jul. 7, 2014.
First Office Action in Japanese Application No. 2011-502139 dated Nov. 5, 2013.
Examination Report in Singapore Application No. 201006874-0 dated May 16, 2012.
Second Office Action in Japanese Application No. 2011-516466 mailed Mar. 17, 2014.
Preliminary Examination in Chinese Application No. 201310717573.1 dated Feb. 25, 2014.
First Office Action in Japanese Application No. 2013-529454 mailed Feb. 3, 2014 in 6 pages.
First Office Action issued in Australian Application No. 2011307319 mailed Mar. 6, 2014 in 5 pages.
Search Report and Written Opinion in Singapore Application No. 201301573-0 mailed Jul. 1, 2014.
Office Action in Japanese Application No. 2013-540982 dated Jun. 2, 2014.
Written Opinion in Singapore Application No. 201303521-7 dated May 20, 2014.
Office Action in Japanese Application No. 2013-123086 mailed Apr. 15, 2014 in 3 pages.
First Office Action in Japanese Application No. 2011-503091 dated Nov. 18, 2013.
Search Report and Written Opinion issued in Singapore Application No. 201006873-2 mailed on Oct. 12, 2011.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2004].
"Content delivery network", Wikipedia, the free encyclopedia, Retrieved from the Internet: URL:http://en.wikipedia.org/w/index.php?title=Contentdelivery network&oldid=6010099 70, XP055153445, Mar. 24, 2008.
First Office Action in Chinese Application No. 201180046104.0 mailed Nov. 3, 2014.
First Office Action is Chinese Application No. 200980125551.8 mailed Jul. 4, 2012.
Office Action in Indian Application No. 3742/KOLNP/2008 dated Nov. 22, 2013.
Gunther et al, "Measuring Round Trip Times to determine the Distance between WLAN Nodes",May 2005, In Proc. of Networking 2005, all pages.
Kalafut et al., Understanding Implications of DNS Zone Provisioning., Proceeding IMC '08 Proceedings of the 8th AMC Sigcomm conference on Internet measurement., pp. 211-216., ACM New York, NY, USA., 2008.
Kato, Yoshinobu, Server load balancer—Difference in distribution technique and supported protoco—Focus on function to meet the needs, Nikkei Communications, Japan, Nikkei Business Publications, Inc., Mar. 20, 2000, vol. 314, pp. 114 to 123.
Supplementary European Search Report in Application No. 09729072.0 2266064 dated Dec. 10, 2014.
Fourth Office Action in Chinese Application No. 200980111426.1 mailed Jan. 15, 2015.
Decision of Refusal in Japanese Application No. 2011-516466 mailed Jan. 16, 2015.
Examination Report in Singapore Application No. 201301573-0 mailed Dec. 22, 2014.
Office Action in Japanese Application No. 2013-529454 dated Mar. 9, 2015.
Office Action in Japanese Application No. 2013-123086 mailed Dec. 2, 2014 in 2 pages.
"Non-Final Office Action dated Jan. 3, 2012," U.S. Appl. No. 12/652,541; Jan. 3, 2012; 35 pages.
"Final Office Action dated Sep. 5, 2012," U.S. Appl. No. 12/652,541; Sep. 5, 2012; 40 pages.
"Notice of Allowance dated Jan. 4, 2013," U.S. Appl. No. 12/652,541; Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Armour et al.: "A Heuristic Algorithm and Simulation Approach to Relative Location of Facilities"; Management Science, vol. 9, No. 2 (Jan. 1963); pp. 294-309.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Search Report for European Application No. 09839809.2 dated May 11, 2015.
First Office Action in Chinese Application No. 201180053405.6 dated May 3, 2015.
Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, Mar. 26-30, 2007.
Fifth Office Action in Chinese Application No. 200980111426.1 mailed Aug. 14, 2015.
Office Action in Japanese Application No. 2014-225580 dated Oct. 26, 2015.
Second Office Action in Chinese Application No. 201180046104.0 mailed Sep. 29, 2015.
Office Action in Canadian Application No. 2816612 dated Nov. 3, 2015.

\* cited by examiner

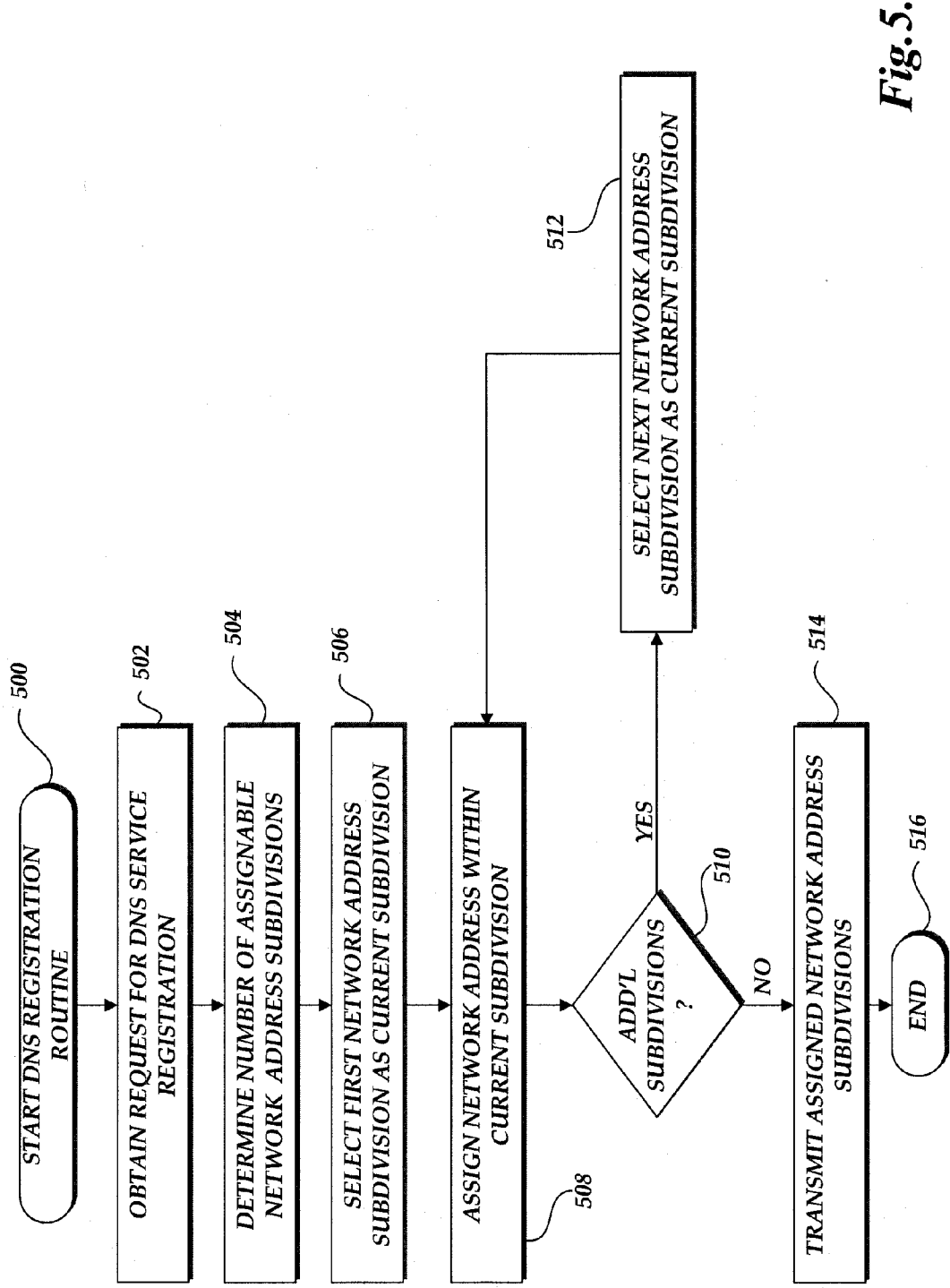

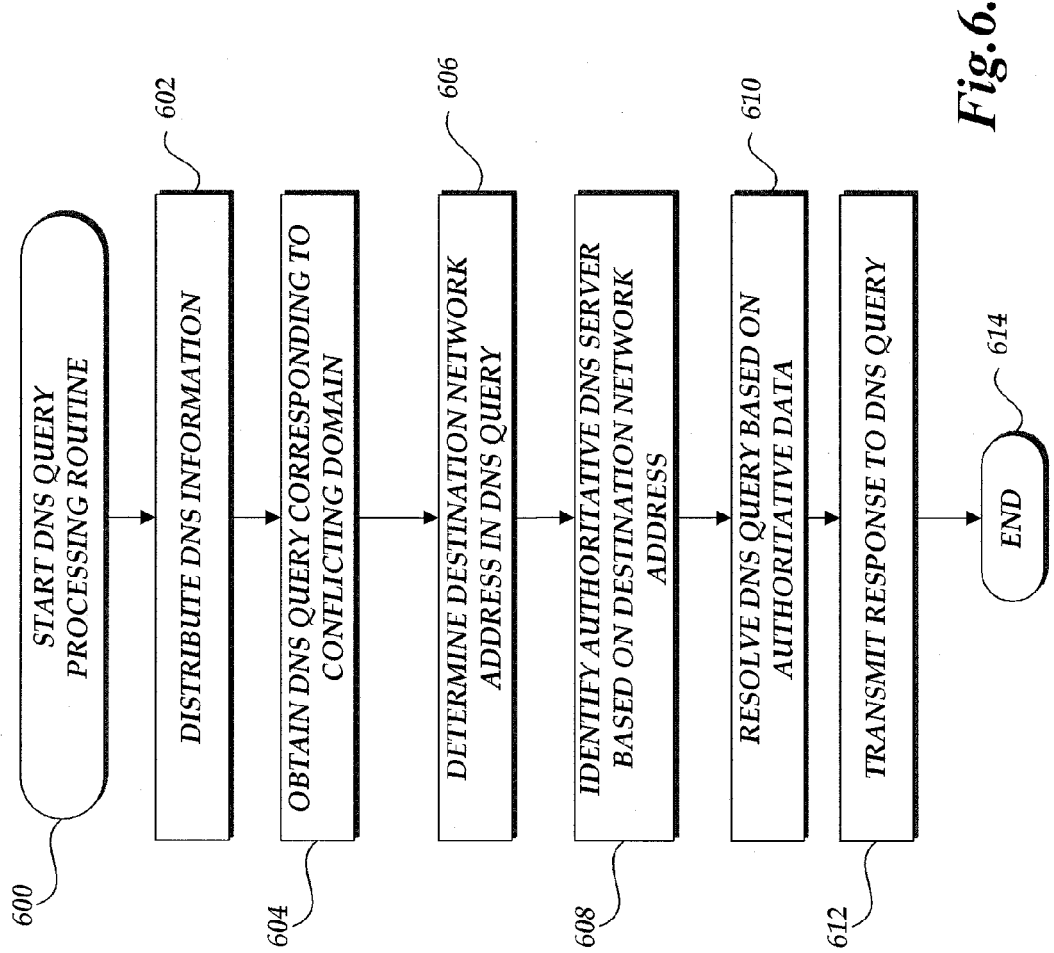

REQUEST ROUTING PROCESSING

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

In some embodiments, the content providers can utilize one or more service providers, such as content delivery network service providers and network storage service providers, to provide services related to the delivery of requested content. In a similar manner, service providers are generally motivated to provide services, such as hosting DNS request processing services or providing content to client computing devices, often with consideration of the efficiency and cost associated with the requested services. For example, service providers often consider factors such as latency of delivery of requested content in processing client computing device requests (either DNS queries or content requests) in order to meet service level agreements or to generally improve the quality of delivered service. However, traditional network routing methodologies limit the service provider to provide DNS request routing services from the same DNS server components for all DNS requests associated with the same domain.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a flow diagram illustrative of a content provider request routing registration processing routine implemented by a service provider; and FIG. 6 is a flow diagram illustrative of a DNS query processing routine implemented by a service provider.

DETAILED DESCRIPTION

Figure 1:
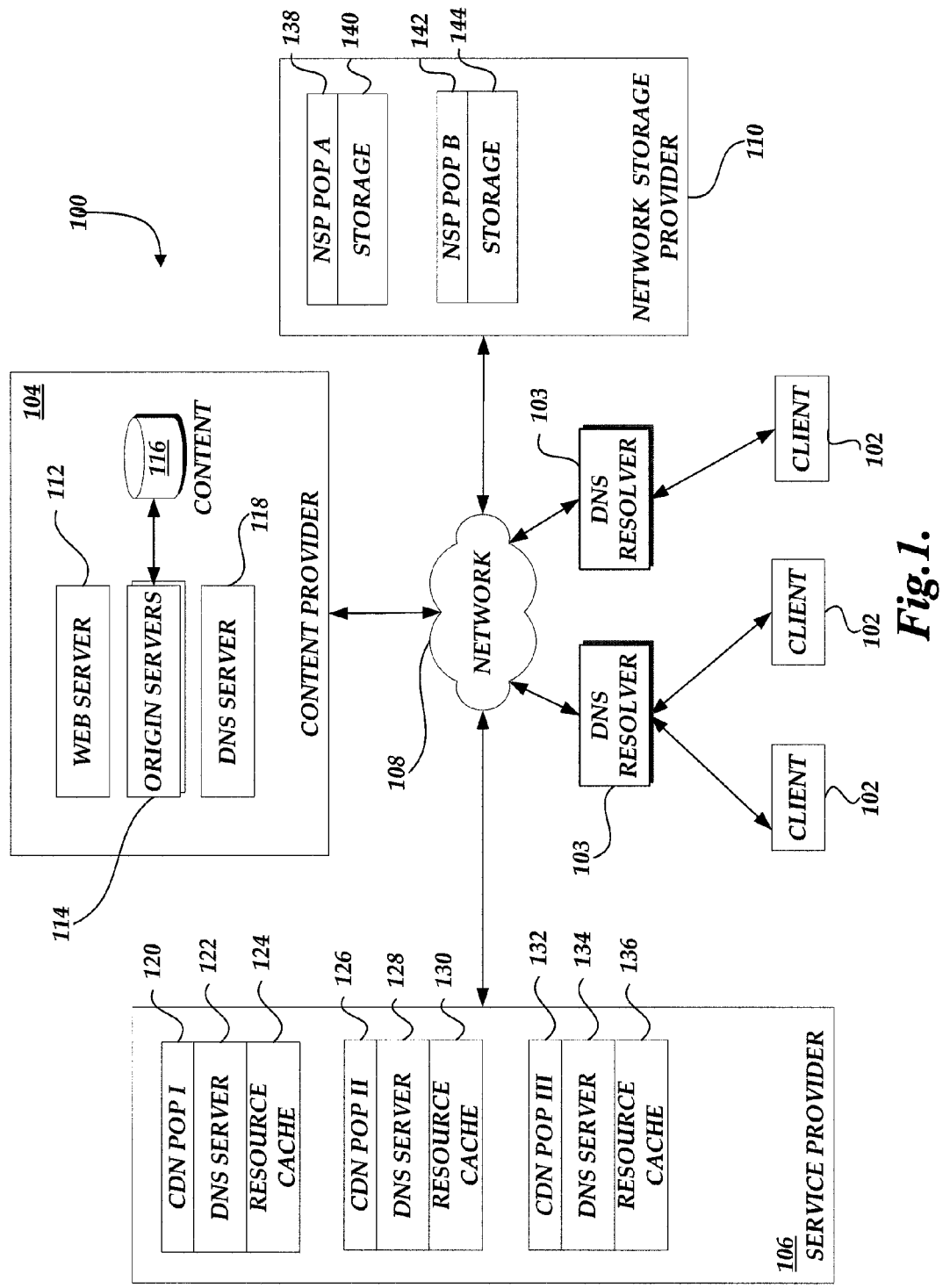
FIG. 1 is a block diagram illustrative of a content delivery environment including a number of client computing devices, a content provider, a network storage provider, and a content delivery network service provider.

Generally described, the present disclosure is directed to managing request routing functionality corresponding to resource requests for one or more resources associated with a content provider. Aspects of the disclosure will be described with regard to the management and processing of request routing functionality by a service provider, such as a content delivery network ("CDN") service provider, on behalf of an entity requesting the request routing functionality, such as a content provider. Illustratively, the request routing functionality can correspond to the processing, by computing devices associated with the service provider, such as a DNS server component associated with a specific network address, of domain name service ("DNS") requests on behalf of a content provider. The service provider DNS server components resolve the received DNS queries by identifying a network address of a computing device that will provide requested resources, such as a cache component. Additionally, in some embodiments content provider domains may be configured such that different sets of clients, through configured DNS resolver components, transmit DNS queries for the same content provider domain to different sets of DNS server components of the service provider. For example, a content provider domain may be configured such that a first set of selective clients transmit DNS queries to a first set of DNS server components associated with the service provider while a larger set of clients transmit DNS queries to a second set of DNS server components of the same service provider.

Specifically, in one embodiment, the service provider can assign two or more sets of DNS server components that will be authoritative for DNS queries to an identified content provider domain on behalf of a content provider. The assigned DNS server components correspond to network addresses that are selected by the service provider from a distributed set of service provider network addresses in a manner that takes into consideration a number of aspects. In one aspect, the service provider can implement processes for ensuring that no two domains, regardless of the owner, are serviced by service provider DNS server components in which the set of DNS server components have matching network addresses. In another aspect, the service provider can implement processes for ensuring that, for a specific domain, the portion of the network addresses of the assigned DNS server components significant for network routing purposes do not having matching values and that the portion of the network addresses of the assigned DNS server component not significant for network routing purposes also do not have matching values. In a further aspect, the service provider can implement processes for ensuring that, for a specific domain, the two or more sets of assigned DNS server components do not have any overlapping portions of the network addresses.

Although various aspects of the disclosure will be described with regard to illustrative examples and embodiments, one skilled in the art will appreciate that the disclosed embodiments and examples should not be construed as limiting. For example, the present disclosure may be described with regard to request routing services provided by a service provider, such as a CDN service provider, that may provide additional services and functionality including network-based storage services, caching services, and content delivery services. However, one skilled in the relevant art will appreciate that a service provider need not provide all, or any, of the additional services or functionality that may be associated with some service providers, such as a CDN service provider. Likewise, although the present application will be discussed with regard to a content provider as the requestor of services, such as the DNS request processing services, the one skilled in the relevant art will appreciate that the requestor of the service need not provide any additional functionality that may be otherwise attributed to content providers.

FIG. 1 is a block diagram illustrative of content delivery environment 100 for the managing registration of a content provider with a service provider, such as a CDN service provider, and subsequent processing of at least a portion of content requests on behalf of the content provider. As illustrated in FIG. 1, the content delivery environment 100 includes a number of client computing devices 102 (generally referred to as clients) for requesting content from a content provider, a network storage provider 110, and/or a service provider 106. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

As also illustrated in FIG. 1, each client computing device 102 utilizes some type of local DNS resolver component 103, such as a DNS Name server, that generates the DNS queries attributed to the client computing device. In one embodiment, the local DNS resolver component may be provided by an enterprise network to which the client computing device 102 belongs. In another embodiment, the local DNS resolver component 103 may be provided by an Internet Service Provider (ISP) that provides the communication network connection to the client computing device 102. As will be described in greater detail below, in an illustrative embodiment, the DNS resolver components 103 can be configured such that DNS queries associated with the same domain (e.g., htpp://www.domain1.com) will be directed to different sets of DNS server components of the service provider.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources and the like. Additionally, although the origin server component 114 and associated storage component 116 are logically associated with the content provider 104, the origin server component 114 and associated storage component 116 may be geographically distributed throughout the communication network 108 in a manner to best serve various demographics of client computing devices 102. Still further, although illustrative components have been described with regard to the content provider 104, a content provider may have any configuration of components associated with a domain addressable on the communication network 108.

As further illustrated in FIG. 1, the content provider 104 can be associated with one or more DNS name server components 118 that are operative to receive DNS queries related to registered domain names associated with the content provider. The one or more DNS name servers can be authoritative to resolve client computing device DNS queries corresponding to the registered domain names of the content provider 104. A DNS name server component is considered to be authoritative to a DNS query if the DNS name server can resolve the query by providing a responsive IP address. As will be explained in greater detail below, in accordance with illustrative embodiments, at least a portion of the request routing functionality provided by the DNS name server components 118 will be provided by a service provider on behalf of the content provider 104.

With continued reference to FIG. 1, the content delivery environment 100 can further include a service provider 106 in communication with the one or more client computing devices 102, the content provider 104, and the network storage provider 110 via the communication network 108. The service provider 106 illustrated in FIG. 1 corresponds to a logical association of one or more computing devices associated with a service provider. Specifically, the service provider 106 can include a number of Point of Presence ("POP") locations 120, 126, 132 that correspond to nodes on the communication network 108. Each POP 120, 126, 132 includes a DNS component 122, 128, 134 made up of a number of DNS server computing devices for resolving DNS queries from the client computers 102. Each POP 120, 126, 132 also optionally includes a resource cache component 124, 130, 136 made up of a number of cache server computing devices for storing resources from content providers or network storage providers and transmitting various requested resources to various client computers. The DNS components 122, 128, 134 and the resource cache components 124, 130, 136 may further include additional software and/or hardware components that facilitate communications including, but not limited to, load balancing or load sharing software/hardware components.

In an illustrative embodiment, the DNS component 122, 128, 134 and resource cache component 124, 130, 136 are considered to be logically grouped, regardless of whether the components, or portions of the components, are physically separate. Additionally, although the POPs 120, 126, 132 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the service provider 106 can be associated with various additional computing resources, such additional computing devices for administration of content and resources, and the like.

With further continued reference to FIG. 1, the content delivery environment 100 can also include a network storage provider 110 in communication with the one or more client computing devices 102, the service provider 106, and the content provider 104 via the communication network 108. The network storage provider 110 illustrated in FIG. 1 also corresponds to a logical association of one or more computing devices associated with a network storage provider. Specifically, the network storage provider 110 can include a number of network storage provider Point of Presence ("NSP POP") locations 138, 142 that correspond to nodes on the communication network 108. Each NSP POP 138, 142 includes a storage component 140, 144 made up of a number of storage devices for storing resources from content providers which will be processed by the network storage provider 110 and transmitted to various client computers. The storage components 140, 144 may further include additional software and/or hardware components that facilitate communications including, but not limited to, load balancing or load sharing software/hardware components.

In an illustrative embodiment, the storage components 140, 144 are considered to be logically grouped, regardless of whether the components, or portions of the components, are physically separate. Additionally, although the NSP POPs 138, 142 are illustrated in FIG. 1 as logically associated with the network storage provider 110, the NSP POPs will be geographically distributed throughout the communication network 108 in a manner to best serve various demographics of client computing devices 102. Additionally, one skilled in the relevant art will appreciate that the network storage provider 110 can be associated with various additional computing resources, such additional computing devices for administration of content and resources, DNS name servers, and the like.

Even further, one skilled in the relevant art will appreciate that the components of the network storage provider 110 and components of the service provider 106 can be managed by the same or different entities. One skilled in the relevant art will also appreciate that the components and configurations provided in FIG. 1 are illustrative in nature. Accordingly, additional or alternative components and/or configurations, especially regarding the additional components, systems and subsystems for facilitating communications may be utilized. Specifically, one skilled in the relevant art will appreciate the network storage provider 110 may be omitted from the content delivery environment 100.

With reference now to FIGS. 2-5B, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
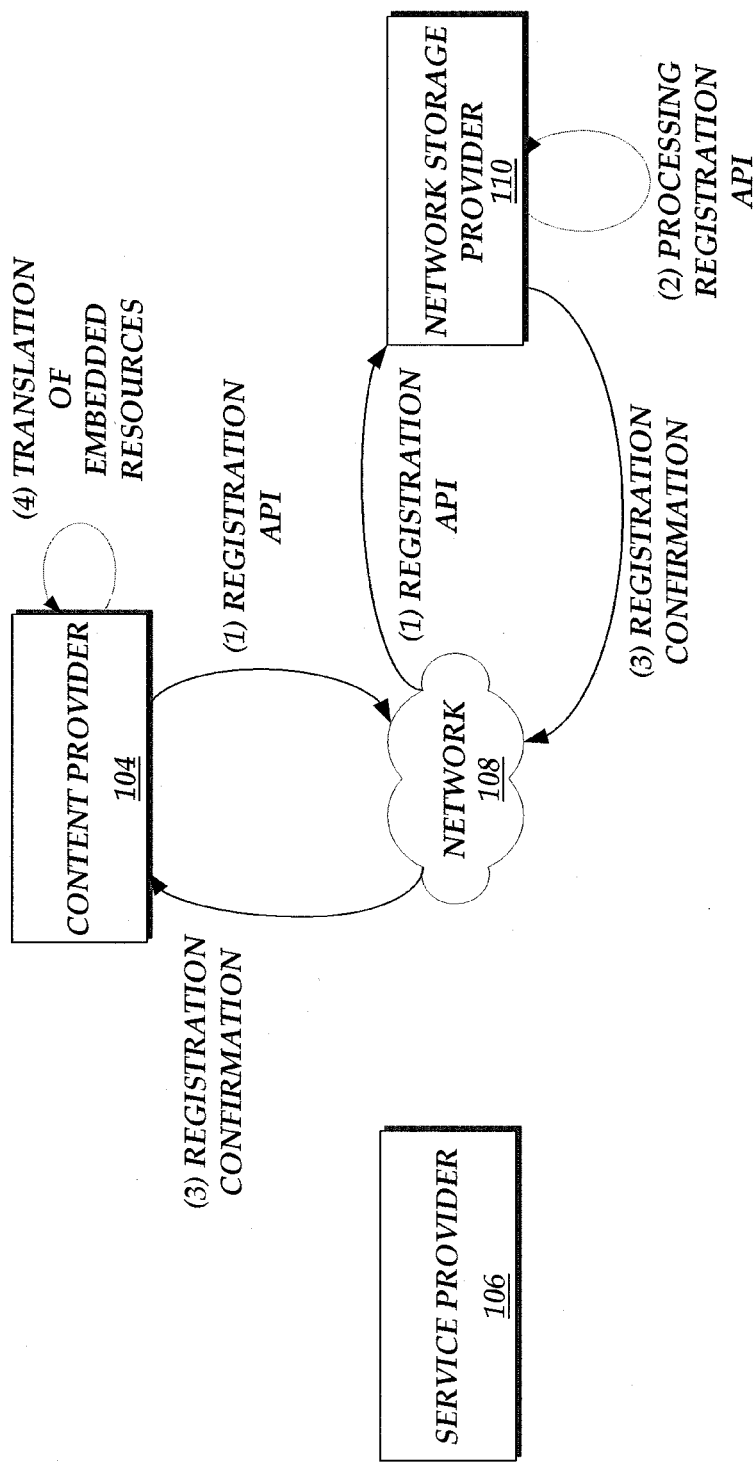
FIG. 2 is a block diagram of the content delivery environment of FIG. 1 illustrating the registration of a content provider with a network storage provider.

With reference to FIG. 2, an illustrative interaction for the optional registration of a content provider 104 with the network storage provider 110 for hosting content on behalf of the content provider 104 will be described. As illustrated in FIG. 2, the storage provider content registration process begins with registration of the content provider 104 with the network storage provider 110. In an illustrative embodiment, the content provider 104 utilizes a registration application program interface ("API") to register with the network storage provider 110 such that the network storage provider 110 can provide content on behalf of the content provider 104. The registration API can include the identification of the origin server 114 of the content provider 104 that may provide requested resources to the network storage provider 110. In addition or alternatively, the registration API can include the content to be stored by the network storage provider 110 on behalf of the content provider 104. In one embodiment, the network storage provider 110 may act as an origin server for the content provider 104.

With continued reference to FIG. 2, upon receiving the registration API, the network storage provider 110 obtains and processes the content provider registration information. In an illustrative embodiment, the network storage provider 110 can then generate additional information that will be used by the client computing devices 102 as part of the content requests. The additional information can include, without limitation, content provider identifiers, such as content provider identification codes, storage provider identifiers, such as storage provider identification codes, executable code for processing resource identifiers, such as script-based instructions, and the like. One skilled in the relevant art will appreciate that various types of additional information may be generated by the network storage provider 110 and that the additional information may be embodied in any one of a variety of formats.

In one embodiment, the network storage provider 110 returns an identification of applicable domains for the network storage provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 114 to a domain corresponding to the network storage provider 110. The translated URLs are embedded into requested content in a manner such that DNS queries for the translated URLs will resolve to a DNS server corresponding to the network storage provider 110 and not a DNS server corresponding to the content provider 104.

Figure 3A:
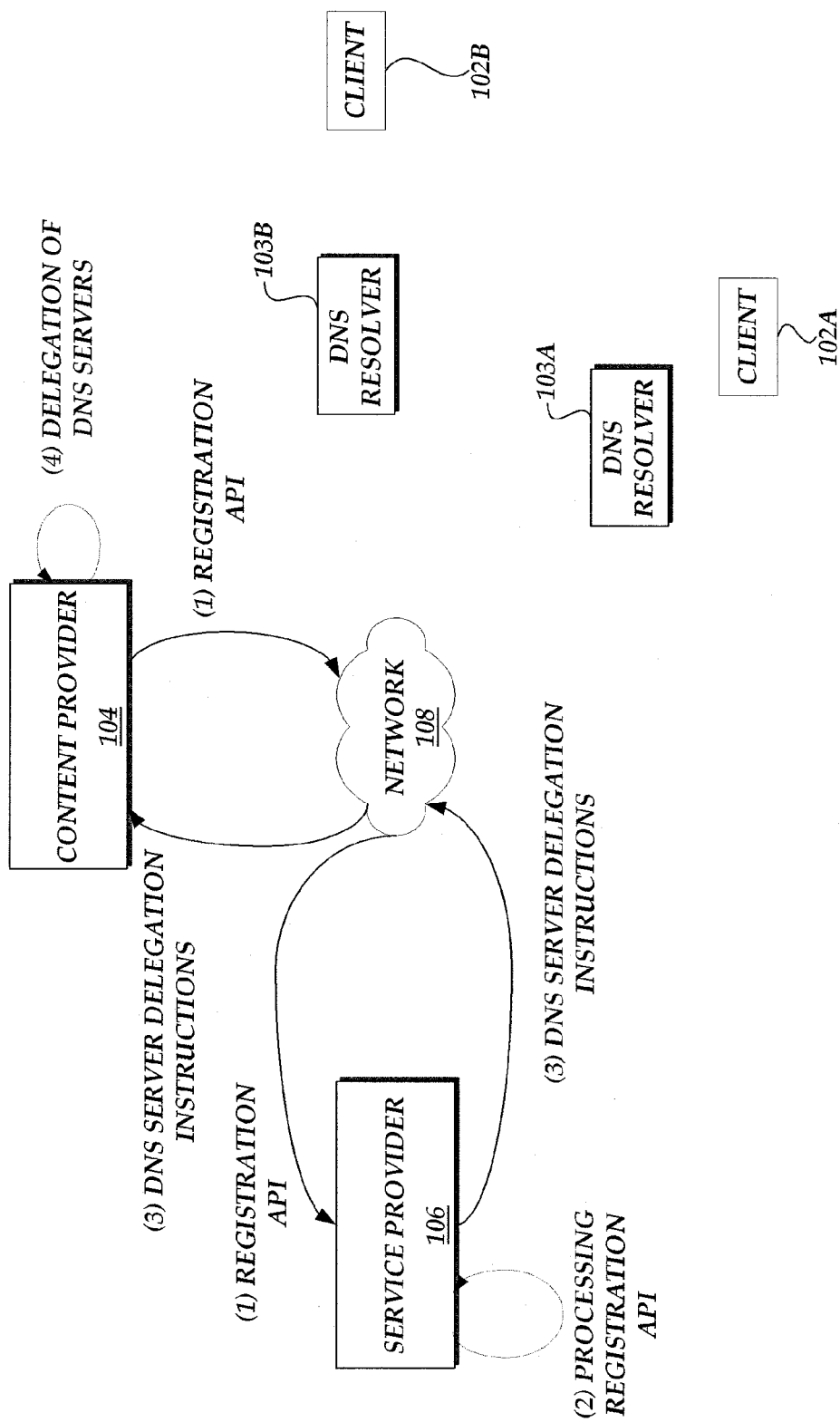
FIGS. 3A and 3B are block diagrams of the content delivery environment of FIG. 1 illustrating the registration of a content provider with a service provider for providing request routing services on behalf of the content provider and the configuration of a DNS resolver component with specific DNS server configurations for a content provider domain.

With reference now to FIG. 3A, an illustrative interaction for registration, by the content provider 104, to utilize the request routing services provided by the service provider 106 will be described. As illustrated in FIG. 3, the request routing service registration process provided by the service provider 106 begins with registration of the content provider 104 with the service provider 106. In an illustrative embodiment, the content provider 104 utilizes a registration API to register with the service provider 106 such that the service provider 106 can provide request routing services on behalf of the content provider 104. The registration API includes the identification of the domains for which the service provider 106 will be authoritative (e.g., "contentprovider.com"), the identification of the storage component 140, 144 of the network storage provider 110 or origin servers 114 that will provide requested resources to the client computing devices 102. The registration API can also include additional information including request routing information, identification information, or other information that will be used to resolve client computing device DNS requests on behalf of the content provider 104, as will be explained below.

The service provider 106 obtains the registration API and processes the information. In one aspect, the service provider 106 can generate the necessary request processing rules or alternative identifiers that may be utilized in the resolution of client computing device DNS queries. In another aspect, the service provider 106 can cause the registration of its DNS nameserver components for the relevant domains specified by the content provider 104. The service provider 106 can then send a response to the content provider 104, such as a confirmation. Responsive to the processing of the registration API, the service provider 106 can identify the network addresses of the service provider DNS servers, such as an Internet Protocol address, that will process DNS queries on behalf of the content provider 104. The content provider 104 can then delegate the identified network addresses of the DNS servers that will be responsible for the identified content provider domain (e.g., "contentprovider.com").

As will be explained in greater detail below, in one embodiment, the service provider 106 can distribute, or otherwise assign, network addresses associated with the DNS server components that will be authoritative to DNS requests to the content provider domain. Specifically, in embodiments in which the service provider 106 will assign a number of DNS server components that will be authoritative for a content provider domain, the service provider can first create a number of subdivisions, or zones, of network addresses available to the service provider. The number of subdivisions or zones corresponds to a distribution of the network addresses such that a selection of a network address from each of the subdivisions or zones ensures that a particular domain's DNS server components have distributed network addresses and avoids situations in which any two assigned DNS server components would have completely overlapping, or exactly matching, network addresses (unless the number of subdivisions or zones is less than the number of DNS server components being assigned as authoritative for a domain). The distribution from different subdivisions can be generally referred to as a "non-overlapping distribution."

For purposes of an illustrative example, assume that the service provider 106 has a pool of available network addresses. The service provider 106 can organize the pool into two or more ranges of network addresses. For example, the ranges can be defined in a manner such that each network address having a common highest ordered octet could be considered to be in the same range. In another example, the ranges can be defined in a manner such that two or mote ranges may share a common highest ordered octet, but are distinguished by different second octets. Further, in another embodiment, the ranges of network addresses can correspond to a number of network addresses available for assignment. In alternative embodiments, at least one range of network address can correspond to a single network address for assignment.

As discussed above, each range of network addresses can be considered to a subdivision or zone of the available network addresses. In one aspect, if the number of subdivisions is equal or greater than the number of network addresses that need to be assigned, the service provider 106 ensures a distribution of network addresses for the DNS server components such that no two network addresses will be matching by selecting a network address from different subdivisions. With reference to the previous example in which ranges are determined according to the highest ordered octet of the network address, each selected network address would correspond to a different value of the highest order octet, which ensures that at least that portion of the network addresses do not overlap (e.g., the second, third, fourth octets) and that no two network addresses for the particular domain will be matching. With reference to another example in which two ranges share common first and second octets, each selected network address would correspond to a different value of the third order octet, which still ensures that at least that portion of the network addresses do not overlap and that no two network addresses for the particular domain will be matching. Depending on the pool of network addresses available to the service provider 106, the ranges of network addresses associated with each subdivision or zone can be configured in various manners depending on the desired distribution of network addresses, the total number of available network addresses and the differences in values among the available network addresses.

In some embodiments, in addition to ensuring a "non-overlapping" distribution of assigned network addresses for a specific domain, if the service provider 106 processes multiple requests for different domains, there is the possibility that such a non-overlapping distribution could result in two or more different domains having at least one assigned DNS network address that matches. In some embodiments, the service provider 106 may wish to establish a threshold number of network addresses that can be matched across unrelated domains (e.g., one, two, three, etc.) or, conversely, a minimum number of network addresses that are not exactly matching between any two non-conflicting domains. Accordingly, the service provider 106 can include different levels of processing regarding any potentially matching assigned network address in accordance with the established threshold of number of acceptable matching network addresses.

Illustratively, the service provider 106 can set the threshold number of acceptable matching network addresses to zero in specific scenarios such that there can be no matching network addresses between a subset of domains. By setting such a threshold to zero, the service provider 106 can ensure that the assigned network addresses of DNS servers do not overlap by removing a DNS server's network address from the pool of available network addresses that have been assigned. One example of such a scenario is if there are two or more hosted domains that would be considered for purposes of network routing to be conflicting by having the same textual name (e.g., a content provider maintaining two or more versions of the same domain). Another example scenario relates to conflicts related to subdomains associated with a content provider (e.g., http://domain.content_provider.com and http://subdomain.domain.content_provider.com). In these scenarios, the service provider 106 may adjust the threshold to zero to ensure that two domains do not have any matching DNS server component network addresses.

In another embodiment, it may be possible for two or more non-conflicting domains to share one or more assigned network addresses of a DNS server component. However, it may be desirable for the service provider 106 to ensure that no two specific non-conflicting domains are assigned the exact same network addresses from each of the subdivisions or that, for any two non-conflicting domains, no more than half of the assigned DNS server component network addresses are matching. In such embodiments, the service provider 106 can conduct additional processing to ensure and correct for matching network addresses, such as by reducing the number of matching network addresses below the threshold. One skilled in the relevant art will appreciate that a service provider 106 may implement varied thresholds such that there will be a first threshold for matching network addresses between a first subset of domains and a second threshold for matching network addresses between a second subset of domains.

In addition to ensuring that assigned network addresses for a specific domain are distributed in a non-overlapping manner and further ensuring that the number of matching network addresses with regard to another domain are not above a threshold, in another embodiment, the service provider 106 can select portions of the selected network addresses from each subdivision such that there is further no overlap in the portions of the selected network addresses that are not typically considered significant for purposes of routing. Specifically, in one embodiment, the network addresses can each correspond to a number of bits that are divided into octets having unique values. For example, a 16-bit network address can be represented in the form of xx.xx.xx.xx in which each xx pair is an octet. Likewise, a 24-bit network address can be represented in the form of yy.yy.yy.yy.yy.yy in which each yy pair represented by four bits. In accordance with network routing principles, a portion of the network address is utilized for network routing (e.g., the first 2 or 3 octets) and is generally referred to as the "most significant portion of the network address" or the "network portion of the network address." The remaining portion of the network address (e.g., the last octet) is not considered to be significant for purposes of network routing and is generally referred to as the "non-significant portion of the network address" or the "host portion of the network address." One skilled in the relevant art will appreciate that the number of octets in a network address that are considered "significant" or "non-significant" may vary according to the specific network protocol being utilized, the configuration of network routing equipment, and other criteria. Accordingly, the example number of octets utilized to illustrate the difference between the significant and non-significant portions of a network address are illustrative in nature and should not be construed as limiting.

For purposes of network routing, network addresses are considered to be non-overlapping or non-matching so long as the significant portions of the network addresses do not exactly match, regardless of whether there are one or more matching octets. The non-significant portions of the network address are effectively ignored for purposes of network routing. Accordingly, in this embodiment, the service provider 106 can select different values for the non-significant portions of the selected network addresses for a specific domain such that the non-significant portions of the selected network address for a specific domain do not exactly match, even if there is some partial matching.

With reference to the previous example, if we assume that four network addresses are selected and the non-significant portion of the network addresses corresponds to the last octet in the network address, the non-significant portion of the network addresses can be subdivided into four ranges of values such there is no overlap in the assigned values for the least most significant bits. Continuing with this example, the last octet has a range of 256 total potential values. Since each domain is illustratively associated with four network addresses, the potential values of the last octet can be divided into ranges of values of 1-63, 64-127, 128-191 and 192-255. Accordingly, the value of the last octet for the first assigned network address would be picked from the range of 1-63; the value of the last octet for the second assigned network address would be picked from the range of 64-127; the value of the last octet for the third assigned network address would be picked from the range of 128-191; and the value of the last octet for the fourth assigned network address would be picked from the range of 192-255. Thus, in this embodiment, the resulting assigned network addresses would be completely non-overlapping with regard to not only the significant portions of the network addresses but also with regard to the non-overlapping portions of the network addresses. Illustratively, the processes and interactions illustrated in FIG. 3A may be repeated a number of times by the content provider 104 to register request routing services from the service provider 106.

Figure 3B:
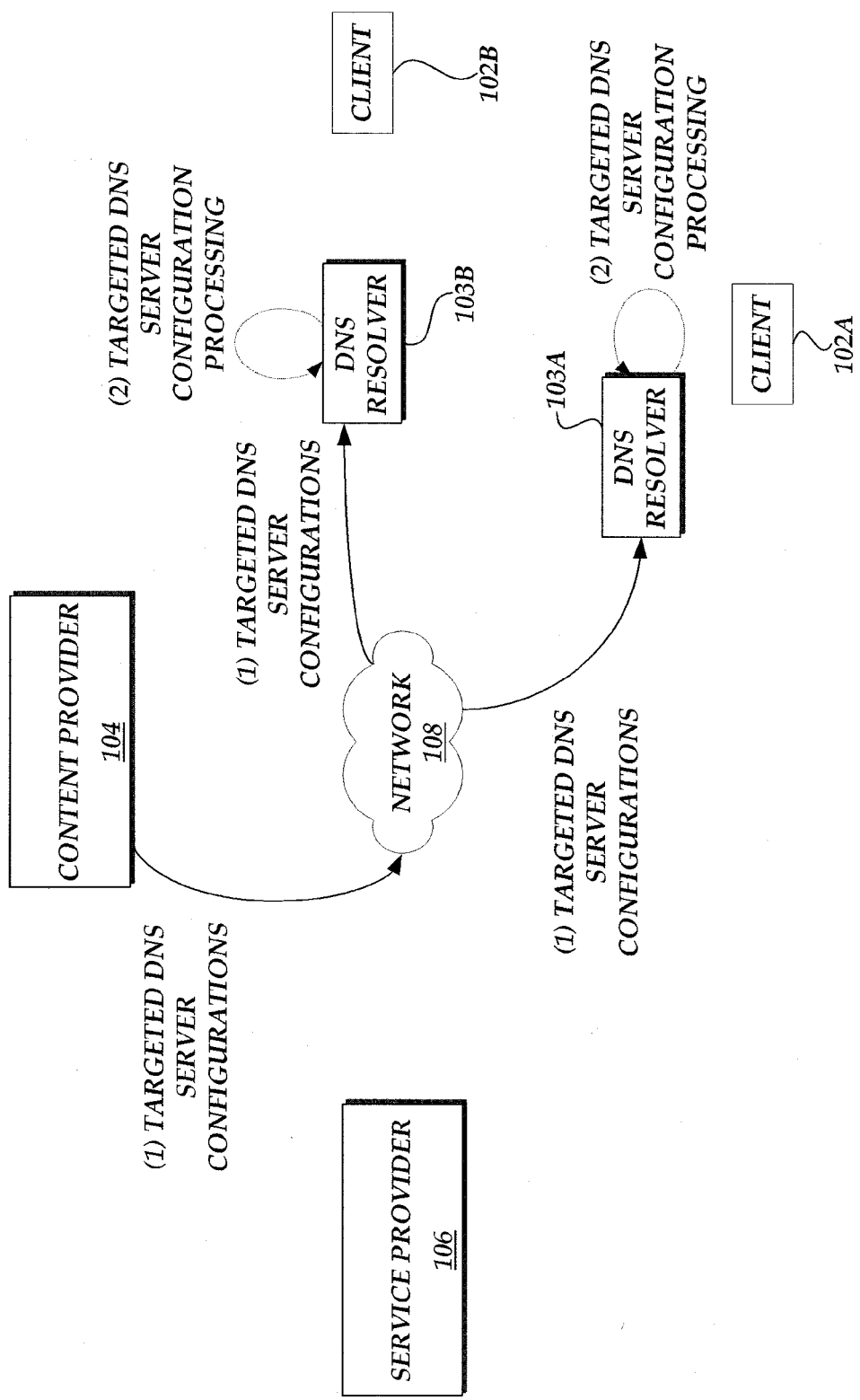

With reference now to FIG. 3B, in an illustrative embodiment, assume that the content provider 104 has repeated the registration process illustrated in FIG. 3A at least two times for conflicting domains. In this embodiment, the content provider 104, or service provider 106, has configured one or more DNS resolver components 103 with different sets of network addresses corresponding to DNS server components that will process DNS queries for conflicting domains. In one example, a content provider 104 may wish to maintain two different versions of a domain (e.g., http://sample.content-provider.com). With reference to the above description of embodiments in which the service provider 106 establishes a threshold that results in no matching network addresses between a subset of domains, such a threshold can be established to set up two or more sets of DNS server component network addresses for a common domain (e.g., http://www-.contentproviderdomain.com). For example, a content provider 104 may wish to configure a first set of DNS server components to process DNS queries for a testing version of a domain while providing a second set of DNS server components to process DNS queries for a production version of the same domain. From the perspective of the client computing devices 102, however, the DNS queries would still correspond to the same domain (e.g., www.contentproviderdomain.com). In another example, a content provider 104 may wish to have a private version of a domain (e.g., an inter-company domain) that is associated with a first set of DNS server components and a public version of the same domain that is associated with the second set of DNS server components.

As illustrated in FIG. 3B, once the two or more sets of DNS server components have been configured, the content provider 104 (or other entity) can implement targeted DNS server configurations to various DNS resolver components 103 in the content delivery environment 100. Illustratively, the targeted DNS server configurations will include the network addresses of the DNS server components that will be authoritative for one or more domains. In one embodiment, the content provider 104 can only specify the network addresses of the DNS server components that will be applicable to each DNS resolver component 103 as well as additional information, such as timing information (e.g., expiration times, "time to live", etc.) and the like. In other embodiments, the content provider can specify multiple sets of DNS server addresses and provide additional logic that allows the DNS resolver components 103 to determine which of the sets of the DNS server addresses should be utilized. The logic can include various selection criteria, such as timing criteria, event criteria, client identifier criteria, network criteria, and the like.

Illustratively, upon the optional identification of appropriate storage component 140, 144 of the network storage provider 110 (FIG. 2) and the registration for request routing services and configuration of DNS resolver components (FIGS. 3A and 3B), the content provider 104 can begin to process DNS requests for content generated on behalf of the client computing devices 102. Specifically, in accordance with DNS routing principles, a client computing device DNS query corresponding to a resource identifier would eventually be resolved by identifying a network address corresponding to either the origin server component 114 and associated storage component 116 or storage—components 140, 144 of the network storage provider 110 by a DNS nameserver associated with the service provider 106.

Figure 4A:
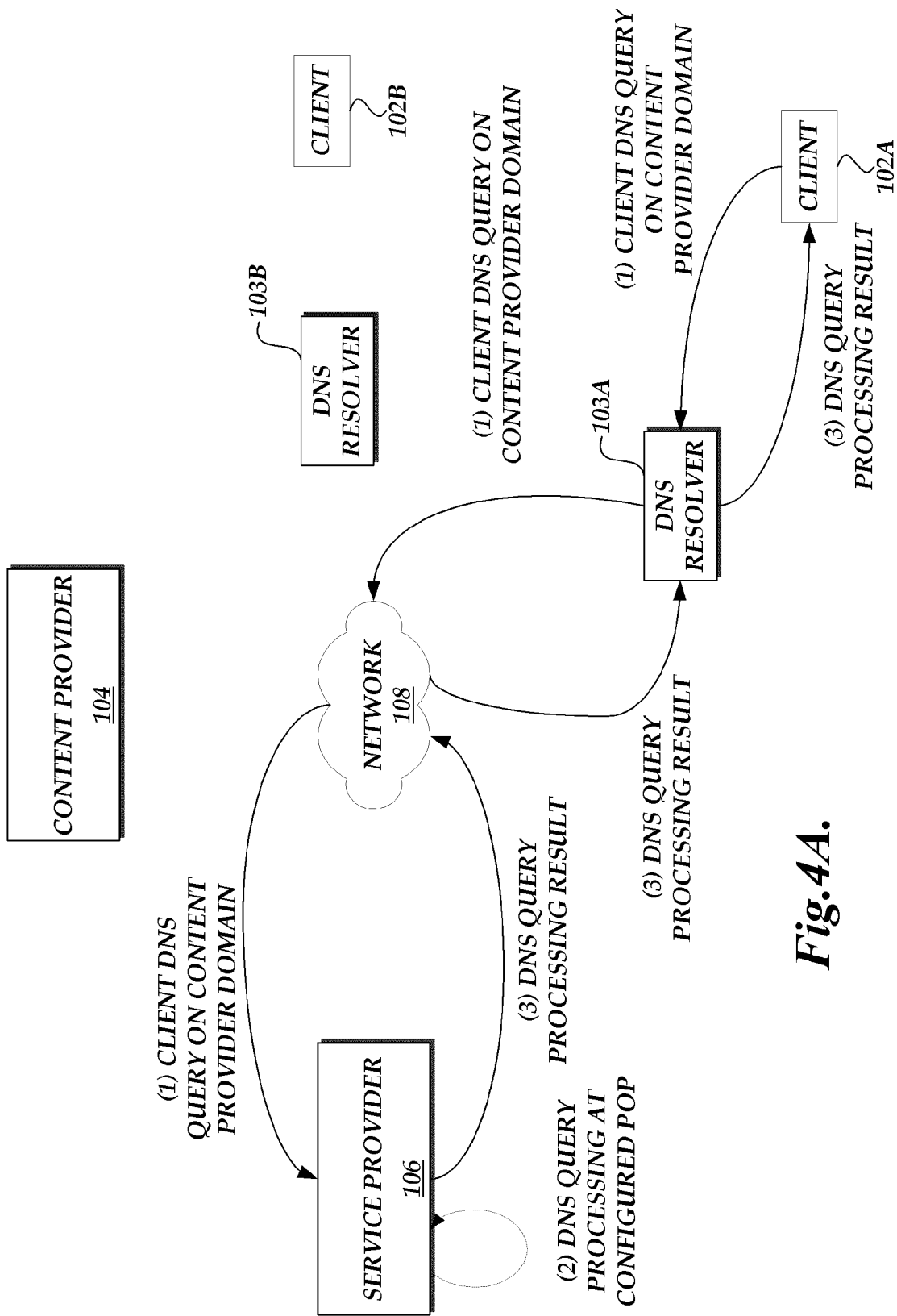
FIGS. 4A and 4B are block diagrams of the content delivery environment of FIG. 1 illustrating the processing of multiple request routing requests by a service provider on behalf of the content provider.
Figure 4B:
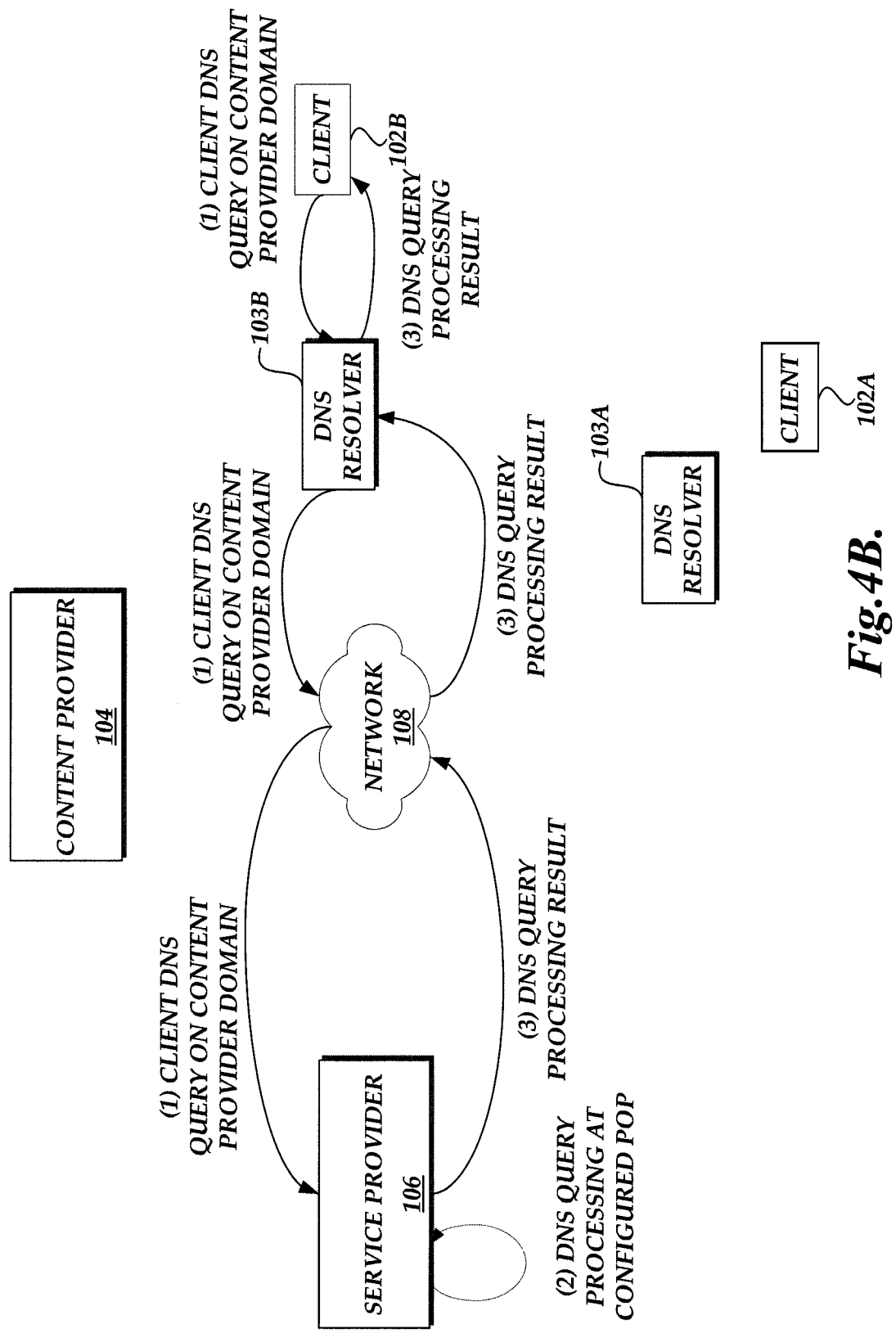

For purposes of an illustrative example and with reference to FIGS. 4A and 4B, assume that the DNS resolver 103A has been configured with a first set of DNS server addresses for a domain while DNS resolver 103B has been configured with a second set of DNS server addresses for a conflicting domain. Additionally, assume for illustrative embodiments, that during the registration process for the conflicting domains, the service providers 106 set the threshold for matching network addresses between the first and second set of network addresses to zero such that there are no matching or overlapping network addresses between the first set of network addresses configured on DNS resolver 103A and the second set of network address configured on DNS resolver 103B.

Turning now to FIG. 4A, in accordance with one embodiment, once the service provider 106 has begun processing request routing functionality on behalf of the content provider, a first client computing device 102A issues a DNS query for the content provider domain (e.g., "contentprovider.com"). Illustratively, the first client computing device 102, such as through a browser software application, issues a DNS query to an associated DNS resolver component 103A. On behalf of the client computing device 102A, the associated DNS resolver component 103A issues a DNS query for the content provider domain that first results in the identification of a DNS server authoritative to the "." and the "corn" portions of the domain. After partially resolving the domain according to the "." and "com" portions of the domain, the DNS resolver component 103A then issues another DNS query for the URL that results in ".contentprovider" portion of the domain. In certain embodiments, the DNS resolver components 103A may have already been configured with the network addresses of the DNS server components and would utilize the configured network address information so long as the configured network address information would be considered valid and applicable.

In an illustrative embodiment, the identification of a DNS server authoritative to the ".content provider" corresponds to one of the first set of assigned IP addresses of a DNS server associated with the service provider 106. In one embodiment, the IP address is a specific network address unique to DNS server component(s) of a specific POP associated with the service provider 106. In another embodiment, the IP address can be shared by one or more POPs associated with the service provider 106, which may be geographically or logically distributed. In this embodiment, a DNS query to the shared IP address utilizes a one-to-many network routing schema, such as anycast, such a specific POP will receive the request as a function of network topology. For example, in an anycast implementation, a DNS query issued by the DNS resolver component 103A to a shared IP address will arrive at a DNS server component of the service provider 106 logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a service provider POP.

As illustrated in FIG. 4A, a DNS server component of the service provider 106 obtains the DNS query and can resolve the DNS query by providing a network address, such as an IP address, of a component for providing the requested content. For example, the receiving DNS server component may provide an IP address of a Web server that can provide a requested Web page. In another example, the DNS server may provide an IP address of a cache component that may provide a requested resource or file. In an alternative embodiment, the DNS server component may also provide alternative identifiers, such as canonical names ("CNAMEs") that can be used to refine request routing processing. In the example illustrated in FIG. 4A, it is assumed that the DNS query transmitted by the client computing device 102A can be processed.

Illustratively, the DNS server receiving the DNS query has been previously configured with information for resolving DNS queries for the conflicting domains. In such embodiments, the one or more DNS server components may be authoritative for processing DNS queries addressed to the first set of network addresses while one or more different DNS server components may be authoritative for processing DNS queries addressed to the second set of network addresses. Alternatively, one or more DNS servers may be configured to receive and be authoritative to DNS queries addressed to the first or second set of network addresses. In such alternative embodiments, such configured DNS server would utilize the destination address of the DNS query to determine whether the DNS query was directed toward the first or second set of network addresses. Based on the destination network address, the receiving DNS server can determine which information to provide to resolve the DNS query. Illustratively, the returned information can include IP address information corresponding to a component of the service provider 106 or storage service provider 110. Additionally, the returned information can include meta-data, such as information identifying authoritative nameservers or used to identify authoritative nameservers.

Turning now to FIG. 4B, in accordance with the illustrative example, a second client computing device 102B, such as through a browser software application, issues a DNS query to an associated DNS resolver component 103B. On behalf of the client computing device 102B, the associated DNS resolver components 103B issues a DNS query for the content provider domain that first results in the identification of a DNS server authoritative to the "." and the "corn" portions of the domain. After partially resolving the domain according to the "." and "corn" portions of the domain, the DNS resolver components 103B then issues another DNS query for the URL that results in ".contentprovider" portion of the domain. In certain embodiments, the DNS resolver components 103B may already been configured with the network addresses of the DNS server components and would utilize the configured network address information so long as the configured network address information would be considered valid and applicable.

In an illustrative embodiment, the identification of a DNS server authoritative to the "contentprovider" corresponds to one of the second set of assigned IP addresses of a DNS server associated with the service provider 106. In one embodiment, the IP address is a specific network address unique to DNS server component(s) of a specific POP associated with the service provider 106. In another embodiment, the IP address can be shared by one or more POPs associated with the service provider 106, which may be geographically or logically distributed. In this embodiment, a DNS query to the shared IP address utilizes a one-to-many network routing schema, such as anycast, such a specific POP will receive the request as a function of network topology. For example, in an anycast implementation, a DNS query issued by the DNS resolver components 103B to a shared IP address will arrive at a DNS server component of the service provider 106 logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a service provider POP.

As illustrated in FIG. 4B, a DNS server component of the service provider 106 obtains the DNS query and can resolve the DNS query by providing a network address, such as an IP address, of a component for providing the request content. For example, the receiving DNS server component may provide an IP address of a Web server that can provide a requested Web page. In another example, the DNS server may provide an IP address of a cache component that may provide a requested resource or file. In an alternative embodiment, the DNS server component may also provide alternative identifiers, such as CNAMEs at can be used to refine request routing processing.

In the example illustrated in FIG. 4B, it is also assumed that the DNS query transmitted by the client computing device 102 can be processed. As previously described with regard to FIG. 4A, in one embodiment, the DNS queries are serviced by different sets of DNS server components that have been configured to process DNS queries associated with either the first or second set of network addresses. Accordingly, the resolution of the DNS queries between client computing device 102A and client computing device 102B is separately controlled by the respectively configured DNS servers. For example, client computing device 102A may be provided access to a restricted set of cache server components while client computing device 102E may be provided access to a non-restricted set of cache server components. Alternatively, one or more DNS servers associated with the service provider 106 have been configured to receive and be authoritative to DNS queries addressed to the first or second set of network addresses (e.g., DNS queries from DNS resolvers 103A and 103B). In such alternative embodiments, such configured DNS servers would utilize the destination address of the DNS query to determine whether the DNS query was directed toward the first or second set of network addresses. Based on the destination network address, the receiving DNS server can determine which information to provide to resolve the DNS query. As previously described, the returned information can include IP address information corresponding to a component of the service provider 106 or storage service provider 110. Additionally, the returned information metadata, such as information identifying authoritative nameservers or used to identify authoritative nameservers.

With reference now to FIG. 5, one embodiment of a routine 500 implemented by a service provider 106 for managing registration of content provider 104 will be described. One skilled in the relevant art will appreciate that actions/steps outlined for routine 500 may be implemented by one or many computing devices/components that are associated with the service provider 106, such as a DNS query processing component or a point of presence associated with the service provider. Accordingly, routine 500 has been logically associated as being generally performed by the service provider 106, and thus the following illustrative embodiments should not be construed as limiting.

At block 502, the service provider 106 obtains a request for providing DNS request routing services on behalf of a content provider 104. Illustratively, the request for providing DNS request routing services may be facilitated through a registration API in which the content provider specifies information necessary for the service provider 106 to begin hosting DNS nameserver functionality on behalf of the content provider. The transmission of the registration API (and associated information) may be an automatic process corresponding to an exchange of information between computing devices without need for administrator, or other human interaction. Alternatively, the transmission of the registration API (and associated information) may be an automatic process may be a manual, or semi-manual, process in which an administrator specifies at least a portion of the information necessary for the service provider 106 to begin hosting DNS nameserver functionality on behalf of the content provider.

At block 504, the service provider 106 determines a number of assignable network address subdivisions or zones. As previously described, in one embodiment, the service provider 106 may maintain two or more ranges of DNS server network addresses that can be assigned to content providers. Illustratively, the service provider can maintain a pool of available network addresses that correspond to the DNS server components that can be assigned to a content provider. Accordingly, the service provider 106 can organize the pool into two or more ranges of network addresses in which each range of network addresses corresponds to a subdivision or zone. As explained above, the service provider 106 can further select network addresses from the subdivisions to ensure that, for a specific domain, at least the significant portions of the set of assigned network addresses will not have any exactly matching values, regardless of whether there are at least some common values.

At block 506, the first network address subdivision is selected as a current network address subdivision and at block 508, the service provider 106 assigns a network address from the current network address subdivision. In an illustrative embodiment, in addition to the selection of a unique network address from the range of network addresses associated with the current network address subdivision, block 508 can also correspond to the service provider 106 selecting a value for the non-significant portion of the selected network addresses such that for a specific domain, at least the non-significant portions of the set of assigned network addresses also will not have any exactly matching values. One skilled in the relevant art will appreciate that the non-significant portions of the set of assigned network addresses will not be considered matching solely because some portion of the network addresses have common values.

Still further, block 508 can also correspond to the service provider 106 conducting additional processing such that for two domains or the same domain, regardless of ownership, the set of assigned network addresses (either significant portions or a combination of significant and non-significant portions) will have no more than a threshold number of exactly matching network addresses. In one embodiment, the service provider 106 can establish multiple thresholds such that between different domains, there is a first threshold of matching network addresses (e.g., no more than two matching network addresses between any two different domains) and that for a same domain, there is a second threshold of matching network addresses (e.g., no matching network addresses for the same domain). Additionally, the service provider 106 can also conduct some type of conflict resolution such that the assigned network address would not conflict with a previously assigned network address for any domain that would be considered a parent domain, a child domain, a sibling domain, etc. In such embodiment, the pool of available network addresses may be filtered to remove any potentially conflicting network addresses.

At decision block 510, a test is conducted to determine whether additional network subdivisions exist. If so, at block 512, the service provider 106 selects a next network address subdivision as the current network address subdivision and the routine 500 proceeds to block 508 to select another network address for the current subdivision. With reference to the previous example, the routine 500 can repeat to assign a network address for each of the remaining three network address subdivision ranges and values for the non-significant portions of the network address (e.g., ranges of 64-127, 128-191 and 192-254 for the last octet of the assigned network addresses). Additionally, the routine 500 can provide the additional conflict resolution or other limitation techniques, described above, to filter out network addresses that should not be assigned to the content provider. However, in an alternative embodiment, the service provider 106 may not necessarily assign network addresses from all the available network address subdivisions or zones.

Once all the network addresses have been assigned, at block 514, the service provider 106 transmits assigned network addresses in response to the request for DNS service hosting. Based on the identified network addresses, the content provider can delegate the identified domain to the assigned network addresses. One skilled in the relevant art will appreciate that upon delegation of the assigned network addresses (or DNS nameserver names), the service provider 106 can host the DNS nameserver components on different computing devices in a manner that each physical computing device can correspond to one subdivision or zone or less than all the subdivisions or zones. At block 516, the routine 500 ends.

With reference now to FIG. 6, one embodiment of a routine 600 implemented by a service provider 106 for processing DNS queries will be described. Illustratively, the DNS queries are initiated by client computing devices 102 and facilitated through configured DNS resolver components 103 as discussed above. One skilled in the relevant art will appreciate that actions/steps outlined for routine 600 may be implemented by one or many computing devices/components that are associated with the service provider 106, such as a DNS query processing component or a point of presence associated with the service provider. Accordingly, routine 600 has been logically associated as being generally performed by the service provider 106, and thus the following illustrative embodiments should not be construed as limiting.

At block 602, the service provider 106 distributes DNS information to the various POPs, such as POPS 120, 126 and 132. Illustratively, the DNS information includes information identifying the sets of network addresses configured for various registered domains. Additionally, in embodiments, in which conflicting domains have been registered with the service provider 106, the distribution of DNS information includes criteria for determining information in response to DNS queries for conflicting domains, including IP address information, meta-data, and the like.

At block 604, the service provider 106 receives a DNS query. Illustratively, if the DNS query corresponds to a non-conflicting domain, the receiving DNS server can process the DNS query with the previously distributed DNS information. Alternatively, if the DNS query corresponds to a conflicting domain, at block 606, the service provider determines the destination address associated with the DNS query. One skilled in the relevant art will appreciate that a destination address is typically included in a DNS query. Alternatively, the DNS query can include additional identification information, such as in the URL, that identifies the destination address. For example, a URL can be modified to include a destination identifier as a label to a URL.

At block 608, the service provider 108 utilizes the identified destination address to identify which network address from one or more sets of network address is authoritative to resolve the DNS query. Illustratively, for conflicting domains, the information provided by the DNS servers in resolving the DNS queries for the conflicting domains will be different. As described above with regard to block 602, illustratively, the DNS servers have been provided with different information that can be selected by the DNS servers based on a determination of which set of network addresses will be authoritative for the received DNS query corresponding to a conflicting domain. At block 610, the service provider 106 resolves the DNS query based on the selected information and transmits the resolved DNS query at block 612. Illustratively, the resolution of the DNS query can include the identification of an IP address of a component of the service provider 106 or storage service provider 110. Additionally, the resolution of the DNS query can include additional meta-data that facilitates additional interaction with the service provider 106 or storage service provider 110. Specifically, the meta-data can illustratively include information identifying authoritative nameservers or used to identify authoritative nameservers. At block 614, the routine 600 terminates.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for managing domain name service (DNS) queries comprising:

obtaining, by a service provider, a DNS query corresponding to an identifiable domain, the DNS query including a destination network address of a DNS server of the service provider obtaining the DNS query;

responsive to the DNS query, determining, by the service provider, that the identifiable domain corresponds to first and second conflicting domains, wherein the first conflicting domain is associated with a first set of network addresses, wherein the second conflicting domain is associated with a second set of network addresses, and wherein there are no matching network addresses between the first and second sets of network addresses;

determining, by the service provider, whether the identifiable domain corresponds to the first or second conflicting domain based on a comparison of the identified destination network address included in the DNS query with the first and second set of network addresses; and resolving the DNS query and transmitting, by the service provider, information associated with the determined either first or second conflicting domain responsive to the DNS query, wherein the information includes an identification of a network address corresponding to the resolved DNS query and metadata associated with the identified network address.

2. The method as recited in claim 1, wherein the first and second sets of network addresses are selected from network address subdivisions corresponding to nonoverlapping ranges of available network addresses for service provider DNS server components.

3. The method as recited in claim 1, wherein the network addresses correspond to Internet protocol network addresses.

4. The method as recited in claim 1, wherein the first and second conflicting domains are based on a first identifiable domain and a second identifiable domain associated with a same textual domain name.

5. The method as recited in claim 1, wherein the conflicting domains are based on a first identifiable domain and a second identifiable domain and wherein the second identifiable domain is a subdomain of the first identifiable domain.

6. A method for managing DNS queries comprising:
obtaining, by a service provider, a DNS query corresponding to an identifiable domain, the DNS query including a destination network address of a DNS server of the service provider obtaining the DNS query;

responsive to the DNS query, determining, by the service provider, whether the identifiable domain corresponds to a first conflicting domain associated with a first set of network addresses or a second conflicting domain associated with a second set of network addresses based on a comparison of the identified destination network address included in the DNS query with the first and second set of network addresses; and resolving the DNS query, by the service provider, by providing information associated with the determined either first or second conflicting domain responsive to the DNS query.

7. The method as recited in claim 6, wherein the first and second sets of network addresses are selected from network address subdivisions corresponding to nonoverlapping ranges of available network addresses for service provider DNS server components.

8. The method as recited in claim 6, wherein the network addresses correspond to Internet protocol network addresses.

9. The method as recited in claim 6, wherein the conflicting domains are based on a first identifiable domain and a second identifiable domain associated with a same textual domain name.

10. The method as recited in claim 6, wherein the conflicting domains are based on a first identifiable domain and a second identifiable domain and wherein the second identifiable domain is a subdomain of the first identifiable domain.

11. The method as recited in claim 6, wherein there are no matching network addresses between the first and second sets of assigned network addresses.

12. The method as recited in claim 6, wherein resolving the DNS query includes providing a network address of a component associated with at least one of a service provider and a storage service provider.

13. The method as recited in claim 6, wherein resolving the DNS query includes providing metadata associated with the destination network address.

14. A system for managing DNS queries comprising:
a memory for maintaining information for resolving DNS queries, the memory including a first set of information for resolving DNS queries directed to a first conflicting domain and a second set of information for resolving DNS queries directed toward a second conflicting domain; and a DNS query processing component of a service provider operative to:
obtain a DNS query corresponding to an identifiable domain, the DNS query including a destination network address of a DNS server of the service provider obtaining the DNS query;

responsive to the DNS query, determine whether the identifiable domain corresponds to the first conflicting domain or second conflicting domain based on of the identified destination network address included in the DNS query with a first set of network addresses associated with the first conflicting domain and second set of network addresses associated with the second conflicting domain;

select from the first or second set of network addresses in the memory based on the associated first or second conflicting domain; and resolve the DNS query by providing information associated with the first or second set of network addresses responsive to the DNS query.

15. The system as recited in claim 14, wherein the first and second of network addresses are selected from network address subdivisions corresponding to nonoverlapping ranges of available network addresses for service provider DNS server components.

16. The system as recited in claim 14, wherein the network addresses correspond to Internet protocol network addresses.

17. The system as recited in claim 14, wherein first conflicting domain and the second conflicting domain are associated with a same textual domain name.

18. The system as recited in claim 14, wherein the second conflicting domain is a subdomain of the first conflicting domain.

19. The system as recited in claim 14, wherein there are no matching network addresses between the first and second sets of network addresses.

20. The system as recited in claim 14, wherein resolving the DNS query includes providing a network address of a component associated with at least one of a service provider and a storage service provider.

21. The system as recited in claim 20, wherein the DNS query processing component further provides metadata associated with the destination network address, the metadata associated with the first or second set of information.

* * * * *